US012681739B2

(12) United States Patent
Kozemirov et al.

(10) Patent No.: US 12,681,739 B2
(45) Date of Patent: Jul. 14, 2026

(54) FRAMEWORK AGNOSTIC UI TOOLKIT

(71) Applicant: Acronis International GmbH, Schaffhausen (CH)

(72) Inventors: Pavel Kozemirov, Sofia (BG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 323 days.

(21) Appl. No.: 18/477,028

(22) Filed: Sep. 28, 2023

(65) Prior Publication Data

US 2025/0110754 A1 Apr. 3, 2025

(51) Int. Cl.
*G06F 9/451* (2018.01)
*G06F 9/54* (2006.01)

(52) U.S. Cl.
CPC .............. *G06F 9/451* (2018.02); *G06F 9/542* (2013.01)

(58) Field of Classification Search
CPC ................................. G06F 9/451; G06F 9/542
See application file for complete search history.

(56) References Cited

U.S. PATENT DOCUMENTS

| | | | |
|---|---|---|---|
| 7,383,327 B1 | 6/2008 | Tormasov et al. | |
| 7,941,510 B1 | 5/2011 | Tormasov et al. | |
| 11,003,465 B2 | 5/2021 | Hiremath et al. | |
| 2017/0052780 A1* | 2/2017 | Clevenger | G06F 8/36 |
| 2017/0185609 A1* | 6/2017 | Braghin | G06F 8/38 |
| 2018/0239497 A1 | 8/2018 | Hiremath et al. | |
| 2019/0212990 A1* | 7/2019 | Kulkarni | G06F 8/433 |
| 2020/0150981 A1 | 5/2020 | Westberg et al. | |
| 2022/0012023 A1 | 1/2022 | Lampon-Monk | |
| 2022/0291788 A1 | 9/2022 | Akrabi et al. | |
| 2023/0086308 A1* | 3/2023 | Lim | G06F 16/958 |
| 2025/0013440 A1* | 1/2025 | Knauss | G06F 8/38 |

FOREIGN PATENT DOCUMENTS

AU 2015203437 A1 7/2015

* cited by examiner

*Primary Examiner* — Mahelet Shiberou
(74) *Attorney, Agent, or Firm* — ESPE Legal Consultancy FZ-LLC

(57) ABSTRACT

Systems and methods for web UI development, including supporting and rendering UI using multiple frameworks and migrating between different frameworks. Systems and methods can train different adapters for converting UI models in declarative abstract view into framework-specific code and render UI from the code using multiple or optimal frameworks.

20 Claims, 6 Drawing Sheets

100

200

Runtime (Browser page) 201

Abstract Web UI  102

Declarative UI
definitions 108:
Components 202
Validation rules 204
Component dependencies
206

Business logic 110:

Handlers  208

Non-declarative UI
extensions
112

UI Toolkit 104

Renderer Library 114

Abstraction layer 210

Framework adapters
116

React adapter
212A

Vue adapter
212B

New framework
adapter
212

API interaction utility 118

Event handler 214

Rendered Web UI  106

Vue/ React/ New framework

UI action

Backend API 120

FIG. 2

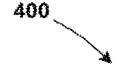
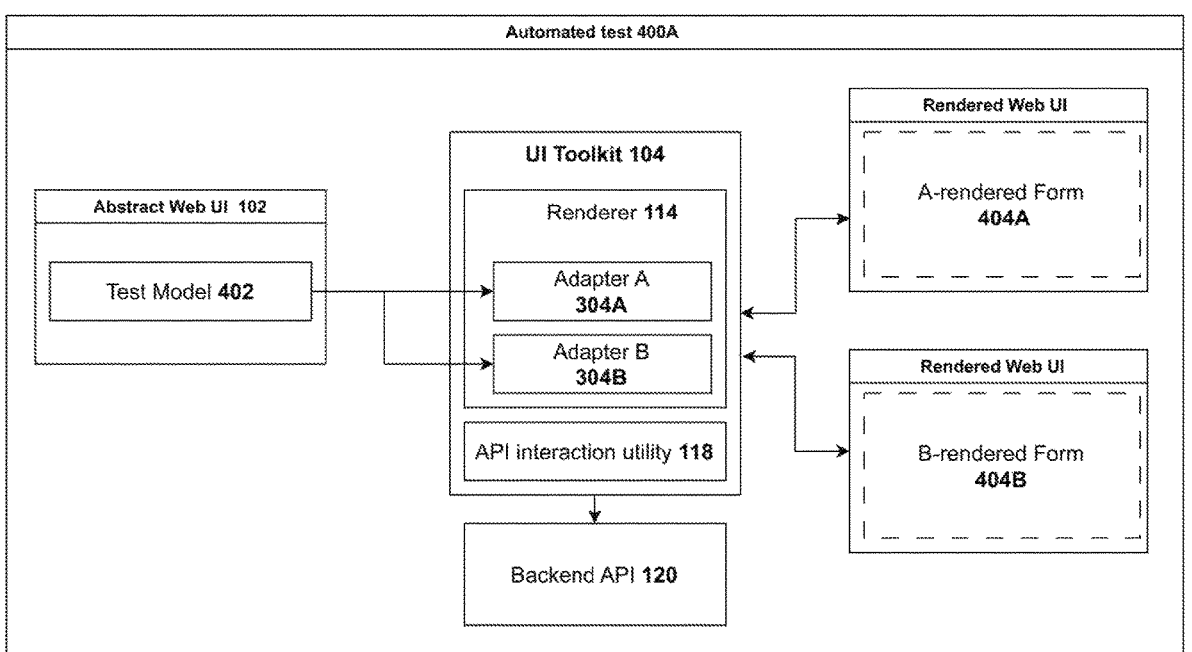
FIG. 4

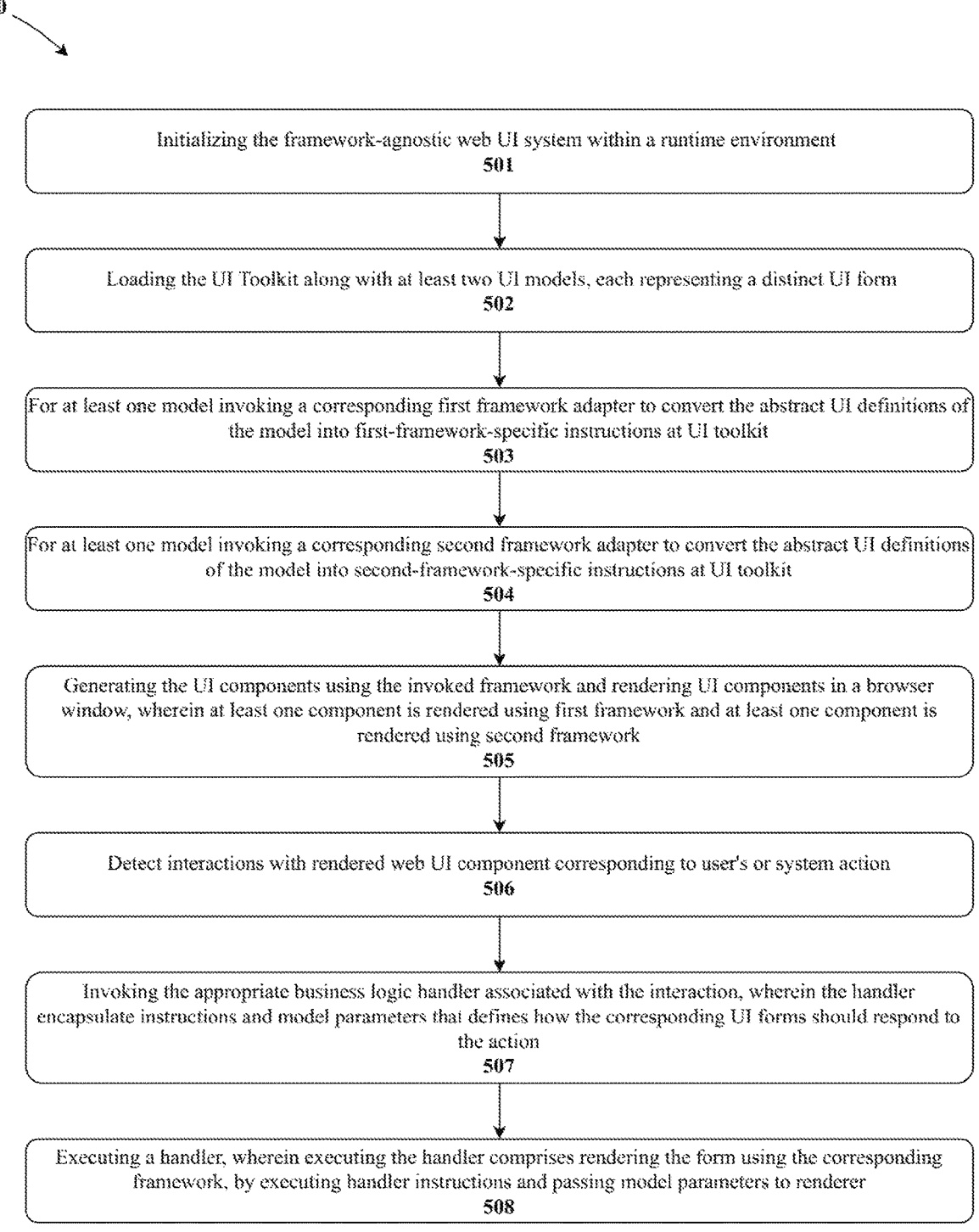

500

Initializing the framework-agnostic web UI system within a runtime environment
501

Loading the UI Toolkit along with at least two UI models, each representing a distinct UI form
502

For at least one model invoking a corresponding first framework adapter to convert the abstract UI definitions of the model into first-framework-specific instructions at UI toolkit
503

For at least one model invoking a corresponding second framework adapter to convert the abstract UI definitions of the model into second-framework-specific instructions at UI toolkit
504

Generating the UI components using the invoked framework and rendering UI components in a browser window, wherein at least one component is rendered using first framework and at least one component is rendered using second framework
505

Detect interactions with rendered web UI component corresponding to user's or system action
506

Invoking the appropriate business logic handler associated with the interaction, wherein the handler encapsulate instructions and model parameters that defines how the corresponding UI forms should respond to the action
507

Executing a handler, wherein executing the handler comprises rendering the form using the corresponding framework, by executing handler instructions and passing model parameters to renderer
508

FIG. 5

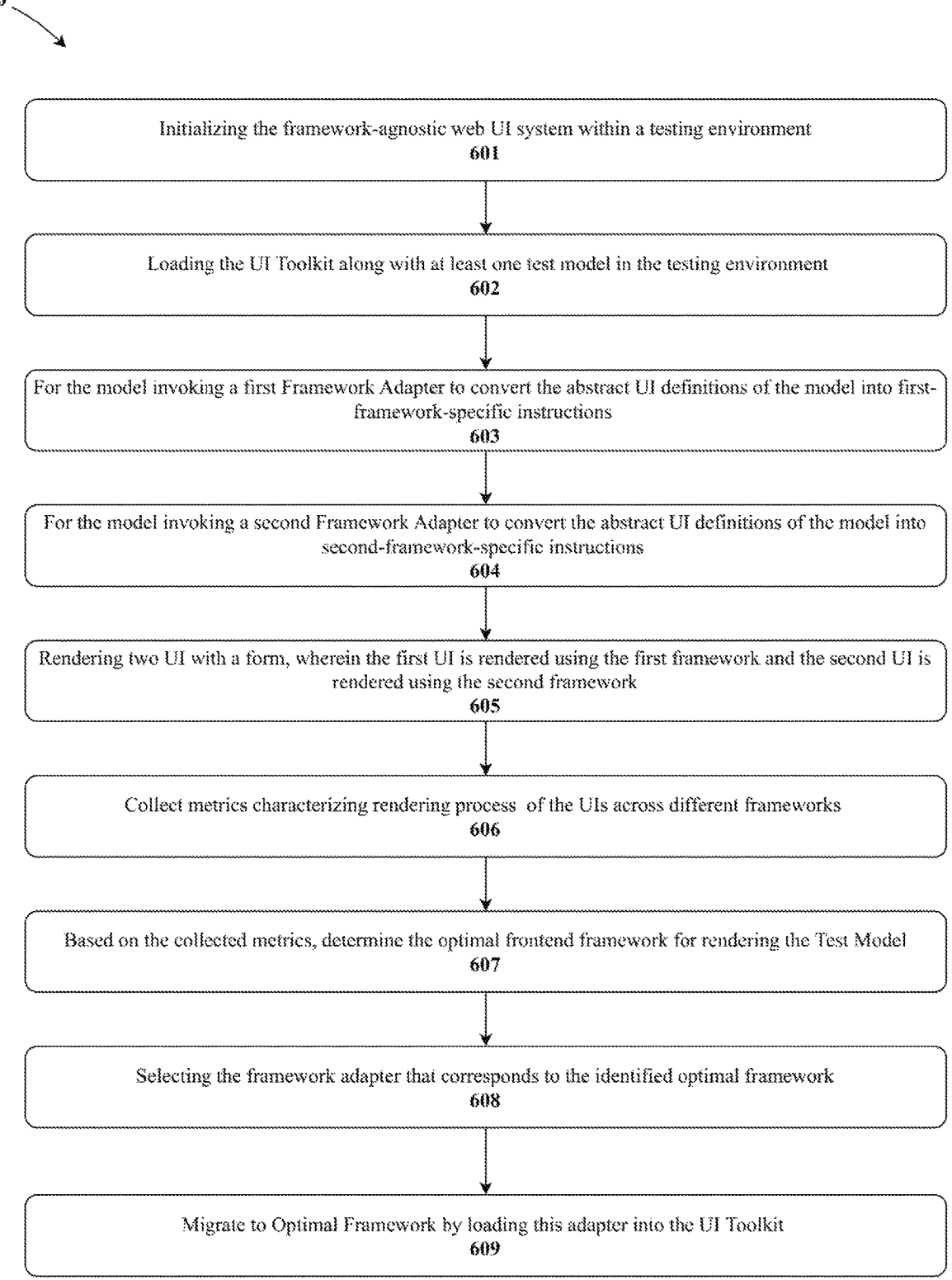

600

Initializing the framework-agnostic web UI system within a testing environment
601

Loading the UI Toolkit along with at least one test model in the testing environment
602

For the model invoking a first Framework Adapter to convert the abstract UI definitions of the model into first-framework-specific instructions
603

For the model invoking a second Framework Adapter to convert the abstract UI definitions of the model into second-framework-specific instructions
604

Rendering two UI with a form, wherein the first UI is rendered using the first framework and the second UI is rendered using the second framework
605

Collect metrics characterizing rendering process of the UIs across different frameworks
606

Based on the collected metrics, determine the optimal frontend framework for rendering the Test Model
607

Selecting the framework adapter that corresponds to the identified optimal framework
608

Migrate to Optimal Framework by loading this adapter into the UI Toolkit
609

FIG. 6

FRAMEWORK AGNOSTIC UI TOOLKIT

TECHNICAL FIELD

Methods and systems consistent with the present disclosure generally relate to web UI development. More particularly, embodiments relate to rendering UI using multiple frameworks and further, to migrating between different frameworks.

BACKGROUND

In recent years, the field of web user interface (UI) development has witnessed substantial advancements, primarily driven by the emergence of various UI frameworks that facilitate efficient and structured design. These frameworks, such as React, Angular, and Vue.js, offer developers a structured environment to create interactive web applications with reusable components. Such frameworks promote the use of declarative UI definitions, enabling developers to specify the desired appearance and behavior of UI elements without delving into the intricacies of low-level code implementation. This approach streamlines development and fosters code maintainability, but also presents challenges when migrating or integrating multiple frameworks due to the inherent incompatibilities and discrepancies in their respective design paradigms.

Declarative UI definitions have become a cornerstone of modern web development, allowing developers to succinctly describe the layout and behavior of user interfaces. These definitions, often expressed using markup languages or domain-specific languages, enable a clear separation between the UI design and the underlying logic. This separation enhances collaboration between designers and developers and expedites the iterative design process. As a result, UI frameworks that embrace declarative definitions have gained widespread adoption and have significantly contributed to the evolution of web applications.

However, the current landscape of framework-based development presents a distinct challenge when it comes to supporting multiple frameworks or transitioning from one framework to another. Organizations often face the intricate task of adapting existing UI components and layouts to fit within a new framework's paradigm during migration, or when attempting to cohesively integrate functionalities from disparate frameworks. This challenge arises due to variations in component lifecycles, state management approaches, and rendering mechanisms among different frameworks. Consequently, developers are often required to invest substantial time and effort in rewriting and retesting code, leading to project delays, increased costs, and potential introduction of errors.

Moreover, the problem of navigating the complexities of supporting or migrating frameworks is compounded by the lack of comprehensive solutions that address the universal compatibility of UI components. While some attempts have been made to create compatibility layers or adapters, these approaches often result in suboptimal performance and convoluted codebases. Therefore, there exists a clear need for improved systems and methods that allow for framework-agnostic web UI development.

SUMMARY

The present disclosure relates to systems and methods for framework-agnostic web UI development. More particularly, embodiments relate to rendering UI using multiple frameworks and further, to migrating between different frameworks.

In a feature and advantage of embodiments, solutions described herein empower developers to create UI components using a unified approach, thereby allowing seamless migration across frameworks and alleviating the challenges associated with maintaining multiple versions of UI code. Embodiments solve the aforementioned problems in the industry to provide an innovative approach to framework-independent web UI development, thus providing a new horizon in the realm of modern web application design and deployment.

In an embodiment, a framework-agnostic UI system for rendering user interfaces across multiple frontend frameworks in a runtime environment, comprises: a UI toolkit, a business logic handlers and an abstraction layer. UI toolkit is operable within the runtime environment and is configured to load and process UI models, and to generate and render UI components for multiple frontend frameworks. UI toolkit comprises: a plurality of framework adapters corresponding to different frontend frameworks, each configured to convert abstract UI definitions from the UI models into framework-specific instructions, a renderer operable with the framework adapters to generate rendered UI components from converted abstract UI definitions, and an event handler module configured to process user interactions with the rendered UI components by invoking one or more business logic handlers. The business logic handlers associated with UI components and including instructions and model parameters define responsive behaviors across the multiple frontend frameworks. The abstraction layer includes a consistent model defining UI components and behavior in a declarative manner, allowing migration from the first frontend framework to a second frontend framework without changing the one or more business logic handlers.

In one aspect, the abstraction layer includes a predefined UI component template.

In one aspect, the runtime environment is at least one of a web browser or a server-side environment, each configured to generate and render user interfaces.

In one aspect, the UI toolkit is a lightweight library.

In one aspect, the UI model is dynamically extensible and configured to add new UI components and behaviors without changing the one or more business logic handlers.

In one aspect, the UI model is defined in a structured format.

In one aspect, the UI component is at least one of a button, an input form, a table, a header, a text field, a data visualization chart, a navigation menu, a dialog box, a progress bar, a dropdown list, a multimedia player, an image gallery, an interactive map, a calendar widget, a collapsible sidebar menu, a notification panel, a file upload interface, a search bar, a dynamic data grid, a filter panel, a form validation component, or an interactive data visualization element.

In one aspect, at least one of the business logic handlers is a script.

In one aspect, at least one of the business logic handlers is linked to at least one specific UI component by an identifier.

In one aspect, at least one of the business logic handlers includes instructions for handling user interactions, comprising at least one of click, input, or gesture.

In an embodiment, a computer-implemented method for rendering UI with multiple frameworks using a framework-agnostic UI toolkit comprises: initializing a system within a runtime environment; loading a UI toolkit and at least two UI models representing distinct UI forms; invoking a first framework adapter for at least one model to convert an abstract UI definition of one of the UI models into first-framework-specific instructions for a first framework; invoking a second framework adapter for at least one model to convert an abstract UI definition of one of the UI models into second-framework-specific instructions for a second framework; generating at least one UI component using the invoked first framework adapter or the second framework adapter; detecting interactions with rendered web UI component; invoking a business logic handler associated with the interactions to define responsive behavior; and executing a business logic handler to render UI forms using the first framework and the second framework based on at least one UI model parameters associated with the responsive behavior.

In one aspect, the runtime environment is at least one of web browser or server-side environment, each configured to generate and render user interfaces.

In one aspect, at least one of the at least two UI models is defined in a structured format.

In an embodiment a computer-implemented method comprises: initializing a system under test within a controlled testing environment; loading a UI toolkit and at least one test model representing a UI form in the controlled testing environment; invoking a first framework adapter for the at least one test model to convert abstract UI definitions of the at least one test model into framework-specific instructions; invoking a second framework adapter for the at least one test model to convert abstract UI definitions of the at least one test model into framework-specific instructions; rendering two UI forms using first and second frameworks; collecting metrics characterizing the rendering process; determining an optimal frontend framework based on the collected metrics; selecting the first framework adapter or the second framework adapter corresponding to the optimal frontend framework; and migrating to the optimal framework by loading the selected first framework adapter or the second framework adapter into the UI Toolkit.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 2 is a block diagram of a system for rendering a web UI using multiple frameworks, in accordance with an embodiment.

FIG. 4 is a block diagram of a testing environment to assess an optimal framework, in accordance with an embodiment.

FIG. 5 is a flowchart of a method for rendering UI with multiple frameworks using a framework-agnostic UI toolkit, in accordance with an embodiment.

FIG. 6 is a flowchart of a method for optimal framework selection and migration using framework-agnostic UI toolkit, in accordance with an embodiment.

Figure 1:
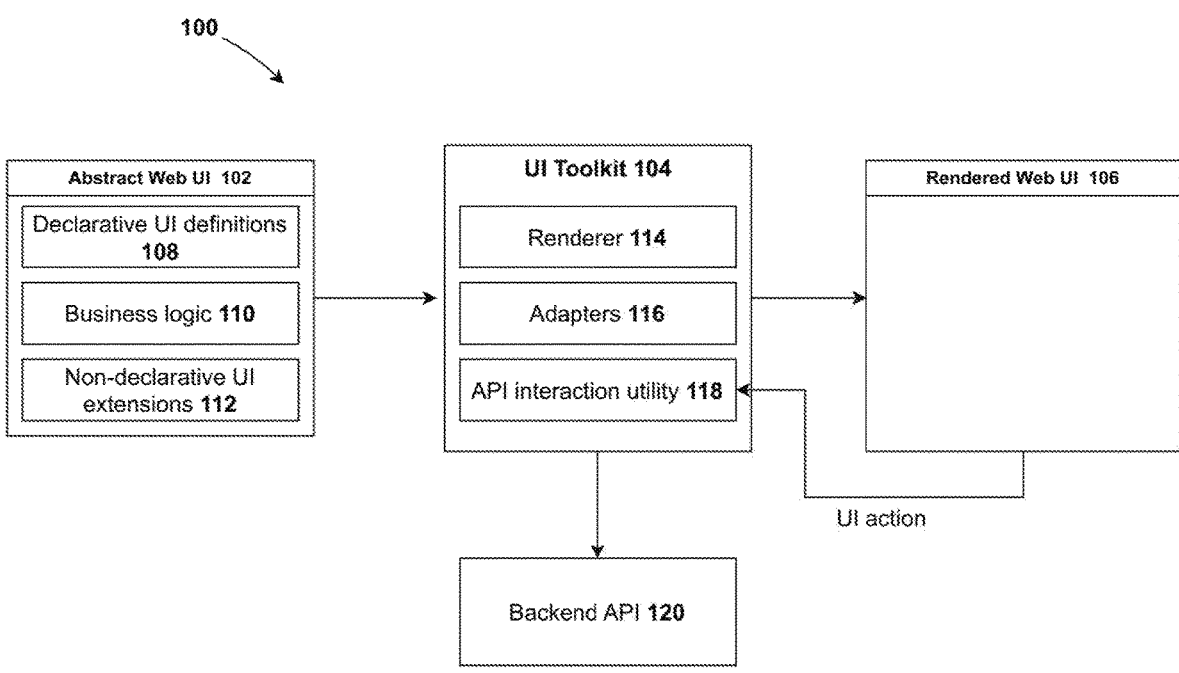
FIG. 1 is a block diagram of a system for framework-agnostic web UI development, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Referring to FIG. 1, a block diagram of a system 100 for framework-agnostic web UI development is depicted, according to an embodiment. System 100 generally comprises an Abstract Web-UI 102, a UI Toolkit 104, and a Rendered UI 106.

Abstract Web-UI 102 is a UI page coded in a declarative format. Abstract Web-UI 102 assumes the role of models within the abstract layer of the UI development process. Unlike a processing module, the coded web pages of Abstract Web-UI 102 operate to determine the views, values, and underlying business logic for each form or group of forms present on a UI page. Effectively, Abstract Web-UI 102 includes the core elements required for UI construction and interaction.

Abstract Web-UI 102 includes Declarative UI Definitions 108, Business Logic 110, and Non-declarative UI extensions 112. In an embodiment, the Declarative UI Definitions 108 serve as the backbone of the UI model. The Declarative UI Definitions 108 abstractly outline the structure and behavior of UI components, enabling developers to specify the UI's appearance and functionality without delving into implementation intricacies. General web-page components and objects, such as buttons, tables, headers, input forms, and more, find their representation within the Abstract Web-UI 102. Each component is defined in terms of its properties, behaviors, and relationships with other components, all expressed declaratively. This approach simplifies the design process, enabling developers to focus on the high-level aspects of UI creation while allowing the UI Toolkit 104 to handle the translation of abstract definitions into concrete UI code. Business Logic 110 complements the declarative definitions. In an embodiment, the Business Logic 110 includes a collection of handlers that define the behavior of the UI components. Non-declarative UI Extensions 112 provide a space to incorporate components or code that stands apart from any specific framework, allowing the integration of specialized UI features.

Various protocols or formats can be employed to define web pages in a declarative manner, including JSON, XML, or even custom domain-specific languages. These formats allow developers to concisely express UI elements' properties and relationships while ensuring a separation between design and implementation.

For the storage and transfer of web pages, multiple file formats can be utilized. Formats like JSON or XML can be employed to store and serialize the declarative definitions of the web pages. In addition, Hypertext Markup Language (HTML) files, commonly used in web development, can also be leveraged to encapsulate declarative UI definitions. This versatility in file formats facilitates easy transfer of web pages between clients and servers, irrespective of the chosen frontend framework.

UI Toolkit 104 plays a pivotal role in converting the abstract representations found within the Abstract Web-UI 102 into tangible UI code. UI Toolkit 104 operates as a lightweight renderer library 114 equipped with an array of Framework-Specific Adapters 116. Framework-Specific Adapters 116, which are readily extendable, facilitate the translation of the abstract UI model into functional UI code that aligns with a chosen frontend framework or JavaScript library. By providing adaptability, the UI Toolkit 104 enables seamless integration and rendering of components libraries written in various frameworks or pure JavaScript.

The distribution format of the UI Toolkit 104 can vary depending on the implementation requirements. The UI Toolkit 104 can be deployed as a standalone library, offering developers a comprehensive set of functionalities to facilitate the translation of abstract UI definitions into concrete code. This library format allows for easy integration into projects, empowering developers to harness its capabilities without the need for complex configurations. Alternatively, the UI Toolkit 104 can be implemented as a browser plugin, thereby enhancing the browser's capability to render and display UI components generated from abstract models. In another embodiment, the UI Toolkit 104 can be a server-based pre-rendering module, allowing complex rendering operations to be offloaded to the server, thus optimizing client-side performance.

The UI Toolkit 104's strength lies in its list of framework-specific adapters 116, which enable the conversion of abstract UI definitions into code compatible with different frontend frameworks. The list of framework-specific adapters 116 can be dynamically extended, ensuring that new adapters can be seamlessly integrated as needed. Updating the list can be achieved through version-controlled updates to the UI Toolkit 104, thereby allowing developers to incorporate newly developed adapters or enhance existing ones without disrupting the application's core logic or business logic. More particularly, a first frontend framework and a different second frontend framework can be implemented together or even migrated without changing the underlying business logic.

In an embodiment, certain framework-specific adapters 116 can be AI-trained models. Such AI-trained adapters leverage machine learning techniques to convert abstract UI models into framework-specific instructions. By training on a variety of UI patterns and their corresponding frameworks, AI-trained adapters provide an intelligent mechanism for translating abstract UI descriptions into optimized code. This approach adds a layer of sophistication to the UI Toolkit 104, enhancing its ability to generate efficient and accurate UI code across a diverse range of frameworks. The incorporation of AI-trained adapters also adds a dimension of AI-driven efficiency, enabling the UI Toolkit 104 to generate framework-specific UI code that aligns with the design principles of the Abstract Web-UI 102.

The terminal result of the operation of system 100 is manifested through the Rendered UI 106. The Rendered UI 106 includes the realized user interface, generated through the UI Toolkit 104 in accordance with the specifications outlined in the Abstract Web-UI 102. By maintaining fidelity to the declarative UI definitions and abstract entities, the Rendered UI 106 ensures a consistent, coherent, and framework-agnostic user experience across different platforms.

In embodiments, the Abstract Web-UI 102 serves as the model for UI construction, determining views, values, and business logic within an abstract layer. The UI Toolkit 104 then bridges the gap between abstraction and realization, employing Framework-Specific Adapters 116 to render the abstract model into functional UI code.

In operation of system 100, an example of converting a web form into a structured JavaScript object is discussed below. Within framework-agnostic system 100, an exemplary HTML form is presented to the user. The HTML form can include login input fields, password input fields, and a submission button, as specified in Abstract Web-UI 102. When a user interacts with this form, their inputs are processed and converted into a JavaScript object. Once the user interacts with the form elements, the appropriate business logic handler 100 associated with these interactions is invoked. These handlers, including instructions and model parameters, define how the UI forms should respond to actions. In this case, business logic handlers 100 manage the conversion of form inputs into a structured data object. In this example, when a user fills in the login and password fields and submits the form, the system processes these inputs through the associated business logic handler 100. Subsequently, the system 100 dynamically converts the user input data into a JavaScript object using UI Toolkit 104, structured as follows:

```
'''javascript
{
    "login": "My-login",
    "password": "My-password"
}
'''
```

This conversion occurs seamlessly within the framework-independent web UI system 100, with the JavaScript object serving as a structured representation of the user's input data.

In another example, the Rendered UI 106 comprises a web page with two distinct forms: an "Update" button (FormA) and a "Table" form (FormB). These components have been developed using two different frontend frameworks, but they are linked using abstract identifiers, such as IDs, names, and headers of UI components or forms. Accordingly, as discussed further below, interaction between these components can seamlessly occur, despite their underlying framework disparities.

Button component ("Update") is a button element that triggers an action when clicked. Its functionality involves fetching data from a database and updating the "Table" form with the retrieved data. The action associated with button component "Update" is coded using the specific attributes of the chosen frontend framework. However, these specific attributes are included within an adapter that belongs to the UI Toolkit 104 (e.g. adapters 116). A particular adapter interprets the action request from the button and translates the action request into a standardized abstract command, independent of the underlying framework. This abstract command is then communicated to the Abstract Web-UI 102, which further handles the instruction based on the defined business logic 110.

Table component form is a representation of tabular data that can be populated with information from a database. Similarly, table component form can be developed using a different frontend framework. The UI Toolkit 104 includes another adapter (e.g. adapters 116) specific to this table component. When the "Update" button is clicked and the abstract command is passed to the UI Toolkit 104, the associated adapter interprets the command and instructs the "Table" component to refresh its data by communicating with the database.

By maintaining a consistent abstraction layer between the UI components and the UI Toolkit 104, the two distinct components can interact harmoniously:

When the "Update" button is clicked, the system 100 generates a command that includes the intent to fetch and update data.

In one embodiment, the abstract command is translated into framework-specific instructions by the respective adapters 116 for the "Button" and "Table" components.

Despite the fact that these components are developed using different frameworks, their actions are seamlessly coordinated through the common abstraction layer (e.g. through Abstract Web UI 102 or its components). This means that the "Table" form can be updated with fresh data, and any changes are reflected in a consistent manner regardless of the frontend frameworks employed.

This example in more detail is described below. If a business-logic-layer JavaScript handler was assigned to this button in the declarative representation of the form, this handler will be called by UI Toolkit, otherwise the definition of the form will be incomplete:

```
Declarative definition of "FormA":
{// incomplete FormA definition
   "id": "form-a", "components": [
      { "type": "button", "onClick": "" // No handler provided for onClick event. Nothing will
happen when the button is clicked.}]}
   {// Full-fledged formA definition
   "id": "form-a", "components": [
      {"type": "button", "onClick": "myButtonClickHandler" //Business-logic-level handler
with name "myButtonClickHandler" is provided. It will be called by UI Toolkit when the button
is clicked }]}
```

The handler "myButtonClickHandler" contains few lines of code, corresponding to:
1) Retrieving table rows from database;
2) Updating the model of form B with these rows.
Handler "myButtonClickHandler" code:

```
async myButtonClickHandler ( ) {
const rows = await getTableRowsFromDatabase( )
   formB.setModel({ rows })}
   Declarative definition of "FormB":
   {// form B definition
      "id": "form-b", "components": [
         {"type": "table", "modelProperty": "rows" //Table rows are mapped to the "rows" field
of the FormB model.}]}
```

Example of full code snippet that would actually render UI and setup the flow:

```
const formA = form('form-a')
   .setActions({
      async myButtonClickHandler ( ) {
         const rows = await getTableRowsFromDatabase( )
         formB.setModel({ rows }) // Model is changed to contain new
         rows}})
const formB = form('form-b')
   .setModel({ rows: [ ] }) // Model with empty rows is set initially
formA.show( )
formB.show( )
```

In essence, the abstract identifiers and standardized commands facilitated by the Abstract Web-UI 102 and the UI Toolkit 104 ensure that interactions between disparate components developed using different frameworks are seamless and coherent. This encapsulation maintains a high level of consistency in user experience, despite the diversity in frontend technologies employed.

In an embodiment, as illustrated in FIG. 1, the UI Toolkit 104 can be operably coupled to a backend API 120. The backend API 120 is responsible for handling data retrieval, storage, and processing, ensuring that the user interface remains responsive and up-to-date. The backend API 120 acts as a bridge between the user interface and the application's data sources, enabling a smooth and responsive user experience. Backend API 210 provides data in a format that is independent of the frontend frameworks used. This means that data can be fetched from the server in a standardized format, making it adaptable to the specific requirements of the UI components, regardless of the frontend framework employed.

For example, if a user interacts with a dropdown list within the user interface and selects an option, the UI component triggers a request to the backend API 120 to fetch relevant data. The backend API 120 processes this request, retrieves the data from the server, and returns it in a structured format, such as JSON (JavaScript Object Notation).

```
Request to Backend API:
   '''javascript GET /api/data?category=selectedCategory'''
Response from Backend API (JSON format):
```

-continued

```
'''json{ "items": [
   { "id": 1, "name": "Item 1" },
   { "id": 2, "name": "Item 2" },
   { "id": 3, "name": "Item 3" }]}'''
```

In FIG. 2, a detailed view of the framework-agnostic web UI system 200 is presented, which depicts components from FIG. 1 and further illustrates various components and interactions.

Importantly, the architecture illustrated in FIG. 2 operates within a runtime environment 201, commonly a web browser, providing users with a dynamic and interactive web experience. In this context, system 200 is utilized as users access web pages that have been constructed using the framework-agnostic web UI approach. The UI Toolkit 104 is loaded alongside the web page, ready to dynamically generate and render the UI components as users interact with the UI components. This dynamic loading and rendering process occurs seamlessly within the user's browser, ensuring a fluid and responsive user experience. The versatile renderer library 114 of the UI Toolkit 104, combined with the adaptability of Framework-Specific Adapters 116, ensures that the web UI components are efficiently generated, tailored to the chosen frontend framework, and displayed in a manner that aligns with the user's actions. In an embodiment, system 200 operates at the runtime level, enabling users to effortlessly engage with the web UI components through the functionalities of the UI Toolkit 104, thus translating abstract UI definitions (e.g. via Abstract Web UI) into tangible and interactive user interfaces.

Declarative UI Definitions 108 include Components 202, Validation Rules 204, and Component Dependencies 206. Components 202 are distinct UI elements, each specified through declarative definitions that encompass structure and behavior. Validation Rules 204 impose constraints on user inputs and interactions, ensuring data integrity and compliance. Component Dependencies 206 define relationships between various UI Components 202, thereby orchestrating Components 202 interactivity and providing a comprehensive framework for UI development.

Business Logic 110, in an embodiment, includes JavaScript Handlers 208 include a range of script-based routines responsible for driving the application's core functionalities. These handlers translate high-level user actions and interactions into specific actions or outcomes within the application, thus orchestrating seamless interaction between user inputs and application behaviors. In an embodiment, Handlers 208 describe page behavior and interactions with components only through parameters represented on the abstraction layer.

Framework Adapters 116 includes specialized adaptors such as React Adapter 212A, Vue Adapter 212B, and New Framework Adapter 212C, and is configured to convert UI from abstract layer into code, aligned with a framework specificity. Thus, UI code is tailored to the requirements of specific frontend frameworks. Each adapter in Framework Adapters 116 is optimized to convert the abstract UI definitions and commands of Declarative UI Definitions 108 into a corresponding set of instructions for the respective frontend frameworks. The New Framework Adapter 212C reflects the system's extensibility by accommodating future frontend frameworks as such frameworks emerge.

In one embodiment, Framework Adapters 116 can be configured to generate UI code that is immediately ready for browsing, functioning as static code. When a user interacts with the Abstract Web-UI 102 to define a UI component, the corresponding Framework Adapter 116 interprets the abstract definitions and transforms the abstract definitions into a static representation that adheres to the nuances and requirements of the chosen frontend framework. The generated static code includes the desired appearance and behavior of the UI component and is capable of rendering directly within a web browser. This embodiment emphasizes efficiency by eliminating the need for additional processing before rendering.

In an alternative embodiment, the role of Framework Adapters 116 extends to converting the declarative view of a UI component into pre-rendered code. In this embodiment, the generated code serves as a foundational structure that must be further processed or linked with specific framework libraries before rendering can occur. When the user specifies a UI component through the Abstract Web-UI 102, the associated Framework Adapter 116 interprets the abstract definitions and generates pre-rendered code that includes the intended visual and interactive features of the component. However, this pre-rendered code requires an additional operation of integration with framework-specific libraries or processing modules to achieve the final rendered output. This approach grants developers more granular control over the rendering process and enables optimizations that align with the intricacies of the chosen frontend framework.

Complementing the API Interaction Utility, an additional component, Event Handlers 214 is configured to handle various aspects of API interactions. Event Handlers 214 are each configured to process different types of data, such as Authentication (Auth), Cache management, Logging, and Tracing. When a user interacts with a UI form, for instance, by pressing a request button, the corresponding event is processed by the Event Handlers 214. Depending on the type of data, the appropriate handler of Event Handlers processes the event, thus streamlining data exchange with external services.

In one particular embodiment, an abstraction layer (e.g. Components 202, Validation Rules 204, and Component Dependencies 206) serves as a central repository, offering a multitude of predefined UI components (e.g. Components 202) and templates, making it easy for developers to create user interfaces. These components cover a wide range of common user interface elements, such as button, input form, table, header, text field, data visualization chart, navigation menu, dialog box, progress bar, dropdown list, multimedia player, image gallery, interactive map, calendar widget, collapsible sidebar menu, notification panel, file upload interface, search bar, dynamic data grid, filter panel, form validation component, or interactive data visualization element and more.

The abstraction layer (e.g. Components 202, Validation Rules 204, and Component Dependencies 206) is further configured to provide developers with variations of these common UI elements, allowing for customization and styling to meet the specific design requirements of the application. Developers can select from various templates and styles, ensuring a consistent and polished user experience across the application. Additionally, an abstraction layer allows for the dynamic generation of UI components based on structured objects, streamlining the process of creating complex user interfaces.

Described further is an example of UI interaction, when a user clicks a "Request" button on a UI form. When this event is processed in Event Handlers 214, the appropriate API Interaction Utility function within API Interaction Utility 118 is invoked. This API Interaction Utility function takes the event parameters from the button press, constructs a database request, and sends the request. Subsequently, the API Interaction Utility function retrieves, parses, and passes the received data to a secondary model for rendering. This secondary model can be a table or a frame, both filled with the requested data. This interaction exemplifies the comprehensive orchestration of various blocks, with business logic, API interaction, and rendering integrated to provide a seamless user experience.

Figure 3:
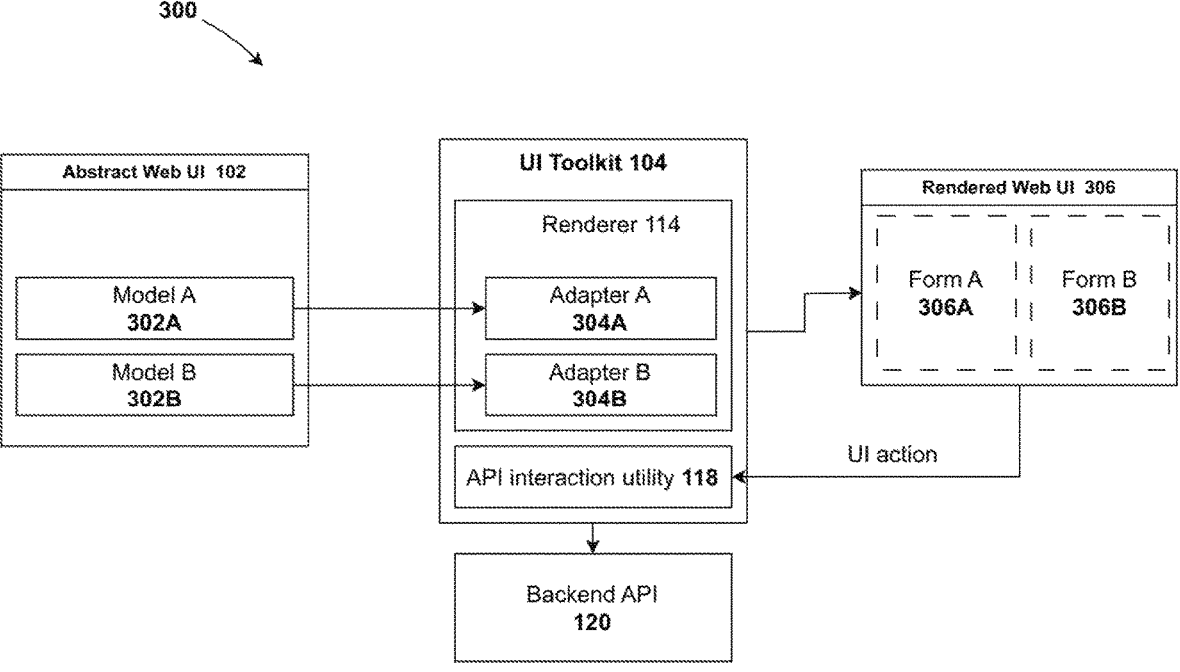
FIG. 3 is a block diagram of a system for rendering a web UI using multiple frameworks from UI models, in accordance with an embodiment.

FIG. 3 illustrates a system 300 for rendering a web UI using multiple frameworks from UI models. The architecture of system 300 extends the foundation laid in FIG. 1, demonstrating how the framework-agnostic approach accommodates diverse models for UI construction and rendering.

Abstract Web-UI 102 in FIG. 3, similar to the unified abstract model in FIG. 1, comprises two distinct models: Model A 302A and Model B 302B. Model A 302A and Model B 302B respectively include all the necessary components, validation rules, component dependencies, and business logic required to implement a comprehensive form described by each model. By allowing the system to operate with multiple models, this embodiment offers enhanced flexibility in UI construction.

A Renderer 114 in the UI Toolkit 104 is further configured to accommodate the rendering needs of multiple frameworks. In this embodiment, the Renderer 114 can handle two different frameworks simultaneously. The selection of the appropriate framework for each model is determined by the Renderer 114, which employs framework detection mechanisms based on the attributes and intricacies of each model.

In one embodiment, an AI-driven approach is employed to intelligently select the most suitable frontend framework for rendering each model within the framework-agnostic web UI system 300. An AI model is trained using a large dataset that includes various characteristics of UI models and their corresponding frontend frameworks. These characteristics can include attributes like UI complexity, interactivity level, data handling requirements, and performance benchmarks. During the training phase, the AI model learns to recognize patterns and relationships between the attributes of UI models and the strengths of different frameworks. The AI model identifies significant features that contribute to the optimal framework choice for a given UI model. When presented with a new UI model, the AI model processes the model's attributes and applies the learned patterns to predict the frontend framework that would provide the best rendering outcome. This prediction is based on the model's understanding of how different frameworks excel in various scenarios.

For example, Model A 302A can describe a dynamic e-commerce product listing page with complex filtering options, while Model B 302B can outline a simple static contact form. The AI model, having been trained on diverse data, recognizes that the attributes of Model A 302A align with the strengths of the React framework, which excels in handling complex data-driven UIs. Conversely, the AI model identifies that Model B 302B, a relatively simple static form, can be optimally rendered using a lightweight framework like Vue.js for its efficiency.

Upon processing these models, the AI-driven selection process would predict React as the appropriate framework for Model A 302A and Vue.js for Model B 302B. The Renderer 114, equipped with the AI model, ensures that the generated UI code adheres to the predicted frameworks, facilitating seamless rendering for both models.

In an alternative embodiment, domain experts with a deep understanding of frontend frameworks can contribute to the framework selection process. These experts can define rules, heuristics, or decision trees that guide the system in choosing the optimal framework based on the characteristics of each model. For instance, an expert might determine that the complex data interactions of Model A 302A necessitate Angular, while the simple form of Model B 302B can be rendered efficiently with Svelte.

Accordingly, both AI-driven and expert-driven approaches empower the framework-agnostic web UI system 300 to intelligently select the most appropriate frontend frameworks for rendering different UI models. This adaptive mechanism ensures that each model is paired with the framework that best aligns with its specific requirements and complexities, enhancing the efficiency and effectiveness of the rendering process.

Adaptor A 304A and Adaptor B 304B are configured to convert and optimize the abstract definitions from Model A 302A and Model B 302B into the respective UI code compatible with the chosen frameworks. Adaptor A 304A translates Model A 302A into framework-specific instructions, while Adaptor B 304B performs the same role for Model B 302B.

The system 300 can process the models in parallel or sequentially, depending on the implementation scenario. In a parallel processing mode, the Adaptor A 304A and Adaptor B 304B can work concurrently to generate UI code for Model A and Model B, optimizing rendering efficiency. In a sequential mode, one model may be processed first, followed by the other. The model processing mode can be defined in Abstract definition of each model.

As a result of this embodiment, the Rendered Web UI Page 306 presents an integrated user experience that includes two distinct forms on a single page: Form A generated using the characteristics of Model A 302A and employing the attributes of Framework A, and Form B generated using the features of Model B 302B and utilizing the traits of Framework B. Despite the utilization of different models and frameworks, the system orchestrates the rendering process cohesively, ensuring a seamless and unified user interface.

For example, Model A 302A can define a complex data-entry form for account creation using React as the framework, while Model B 302B can describe a sleek dashboard interface for data visualization using Vue.js as the framework. The system 300 therefore effectively integrates these diverse models and frameworks to create a single web UI page (Rendered Web UI 306) that seamlessly combines both forms.

FIG. 4 depicts a testing environment 400, illustrating the capabilities of system 300 from FIG. 3 in a controlled testing context. In testing environment 400, a single model Test Model 402 is represented and is rendered using different frontend frameworks. This arrangement allows for a comprehensive assessment of system 400 performance and the visual equivalence of rendered UIs.

As illustrated in FIG. 3, Test Model 402 serves as a representative UI model for testing purposes. Test Model 402 includes all the necessary components, validation rules, dependencies, and business logic required to construct a complex UI form. Test Model 402 is configured to effectively gauge how the rendering process of system 400 behaves across multiple frameworks.

The rendering of Test Model 402 using different frameworks yields two visually similar UIs: A-Rendered Form 404A, which is built using Framework A, and B-Rendered Form 404B, constructed using Framework B. Despite the variations in the underlying technology, both forms maintain the same structural integrity and interactivity, demonstrating the ability of system 400 to generate consistent UIs across diverse frontend frameworks.

The resulting UIs and rendering process of two UIs are evaluated and compared.

The resulting UIs—A-Rendered Form 404A and B-Rendered Form 404B—can be visually compared side by side. This comparison helps assess the visual equivalence of the UI components rendered by different frameworks. Automated image comparison tools can be employed to detect any minute differences in appearance, ensuring a pixel-perfect rendering consistency.

The rendering process of each framework can also be compared to evaluate rendering times, resource consumption, and rendering errors. Profiling tools can measure factors like CPU and memory usage, enabling developers to identify potential bottlenecks or inefficiencies in the rendering process.

The use of declarative UI definitions (e.g. Declarative UI Definitions 108) in the testing environment offers several benefits for automated software testing. Declarative UI definitions ensure that UI components are consistently defined across different testing scenarios, leading to reliable testing outcomes. The abstraction provided by declarative UI definitions allows testers to focus on specific UI components, facilitating targeted testing and faster bug identification. Automated testing scripts can systematically compare rendered UIs across various frameworks, identifying discrepancies in appearance or behavior. Changes in UI code or frameworks can be easily detected through automated regression testing, ensuring that modifications do not adversely affect the UI's intended functionality or appearance. The ability to render the same UI using different frameworks permits cross-framework testing, validating that the same functionality is achieved irrespective of the chosen technology.

Accordingly, FIG. 4 illustrates the controlled testing environment 400A, where the system's rendering capabilities are scrutinized using Test Model 402 across different frameworks. The visual comparison of UIs and profiling of the rendering process allow for comprehensive assessment, while the advantages of declarative UI definitions in automated testing ensure robust testing methodologies and efficient maintenance of UI integrity.

FIG. 5 is a flowchart of a method 500 for rendering UI with multiple frameworks using framework-agnostic UI toolkit, in accordance with an embodiment. In embodiments, method 500 can be implemented by system 100 and/or system 200.

According to an embodiment, at 501, the method 300 initiates by initializing the framework-agnostic web UI system within a runtime environment. This environment, often a web browser, serves as the platform for rendering and interactive user experiences.

According to an embodiment, at 502, the UI toolkit is loaded alongside at least two UI models, each meticulously representing a unique UI form. These models include the design and functional details for generating diverse user interfaces.

According to an embodiment, at 503, the method 300 includes invoking a corresponding first framework adapter. This adapter translates the abstract UI definitions of at least one model into instructions optimized for the first framework. In this instance, the UI Toolkit collaborates with the first framework adapter to create UI components aligned with the characteristics of Framework A.

According to an embodiment, at 504, a similar procedure is applied to another model, involving the invocation of a corresponding second framework adapter. This adapter transforms the abstract UI definitions of the model into instructions tailored for the second framework. Here, the UI Toolkit engages with the second framework adapter to generate UI components that align with the nuances of Framework B.

According to an embodiment, at 505, the UI components are generated. These components are then rendered within a browser window, offering an interactive visual experience for users. Importantly, this rendering encompasses both components from Model A, facilitated by the first framework, and components from Model B, executed using the second framework. For example, Model A's intricate data visualizations may harness React's capabilities, while Model B's straightforward form might leverage Vue.js for efficient rendering.

According to an embodiment, at 506, the method 500 monitors interactions with the rendered web UI components. These interactions can span various user or system actions, such as button clicks or form submissions, influencing the subsequent steps of the method 500.

According to an embodiment, at 507, in response to these interactions, the appropriate business logic handler is invoked. Within this handler, instructions and model parameters include the intended behavior of the corresponding UI forms. This abstraction ensures uniform behavior across multiple frameworks without being burdened by framework-specific intricacies.

According to an embodiment, at 508, the invoked handler is executed. This execution involves rendering the UI form using the corresponding framework. The handler's instructions, alongside model parameters, guide the rendering process, ensuring the UI form responds in alignment with the user's or system's action. Consequently, Model A's complex logic may direct framework A's rendering, while Model B's simpler logic guides framework B's rendering. Actions taken with a form A corresponding to model A, can include operations that need to be done with a form B corresponding to model B. Referring to an example, where the first form is an "Update" button and the second form-table view, the response handler after clicking the button, will first determine the abstract model, that is connected with this button, then reload data from database, and pass the model of the table to renderer with updated parameters.

FIG. 6 is a flowchart of a method 600 for optimal framework selection and migration using framework-agnostic UI toolkit, in accordance with an embodiment. In embodiments, method 500 can be implemented by system 300.

According to an embodiment, at 601, the method 300 commences by initializing the framework-agnostic web UI system within a controlled testing environment. This environment is configured to facilitate rigorous assessment and comparison of the system's performance across different frontend frameworks.

According to an embodiment, at 602, the UI Toolkit is loaded into the testing environment alongside at least one test model. This model serves as the subject for comprehensive evaluation and selection of the optimal frontend framework. In another embodiment, the system and method uses multiple test models, covering all possible forms and behavior of UI.

According to an embodiment, at 603, the method 600 involves invoking a first framework adapter tailored to the chosen test model. The purpose of this invocation is to convert the model's abstract UI definitions into first-framework-specific instructions, thus preparing it for rendering within the framework.

According to an embodiment, at 604, the same process is applied to the test model, this time invoking a second Framework Adapter. This adapter similarly converts the model's abstract UI definitions into second-framework-specific instructions, enabling its rendering within the second framework.

According to an embodiment, at 605, the method 600 advances to render two distinct UIs, each containing a form. The first UI is rendered using the first framework, while the second UI is rendered using the second framework. This dual-rendering approach facilitates a direct comparison between the rendering outcomes achieved by the two frameworks.

According to an embodiment, at 606, the method 600 involves collecting metrics that characterize the rendering process of the UIs across different frameworks. These metrics encompass factors such as rendering time, resource consumption, and visual fidelity. For instance, rendering time metrics might indicate the efficiency of each framework in generating UI components.

According to an embodiment, at 607, based on the collected metrics, the system proceeds to determine the optimal frontend framework for rendering the test model. The analysis of metrics allows for informed decision-making, considering factors such as performance, efficiency, and visual consistency.

According to an embodiment, at 608, the method 600 involves selecting the framework adapter that corresponds to the identified optimal framework. This adapter is specifically tailored to translate abstract UI definitions into instructions optimized for the chosen framework, ensuring compatibility and optimal rendering.

According to an embodiment, at 609, the method completes 600 migrating to the optimal framework by loading the selected adapter into the UI toolkit. Subsequent rendering processes will now employ this adapter to ensure that the optimal framework-specific instructions are followed, enhancing performance and rendering outcomes.

The invention claimed is:

1. A framework-agnostic UI system for rendering user interfaces across multiple frontend frameworks in a runtime environment, comprising:

a computer processor that executes:

a UI toolkit operable within the runtime environment and configured to load and process UI models, and to generate and render UI components for multiple frontend frameworks, comprising:

a plurality of framework adapters corresponding to different frontend frameworks, each configured to convert abstract UI definitions from the UI models into framework-specific instructions, a renderer operable with the framework adapters to generate rendered UI components from converted abstract UI definitions, and an event handler module configured to process user interactions with the rendered UI components by invoking one or more business logic handlers;

the business logic handlers associated with UI components and including instructions and model parameters to define responsive behaviors across the multiple frontend frameworks; and an abstraction layer including a consistent model defining UI components and behavior in a declarative manner such that each UI component is defined according to at least one property, at least one behavior, and at least one relationship with another UI component, wherein the consistent model causes, for a given abstraction layer command, a first UI component to be generated by the first frontend framework from the given abstraction layer command, and a second UI component to be generated by the second frontend framework from the given abstraction layer command, wherein the first UI component and the second UI component interact.

2. The system of claim 1, wherein the abstraction layer includes a predefined UI component template.

3. The system of claim 1, wherein the runtime environment is at least one of a web browser or a server-side environment, each configured to generate and render user interfaces.

4. The system of claim 1, wherein the UI toolkit is a lightweight library.

5. The system of claim 1, wherein the UI model is dynamically extensible and configured to add new UI components and behaviors without changing the one or more business logic handlers.

6. The system of claim 1, wherein the UI component is at least one of a button, an input form, a table, a header, a text field, a data visualization chart, a navigation menu, a dialog box, a progress bar, a dropdown list, a multimedia player, an image gallery, an interactive map, a calendar widget, a collapsible sidebar menu, a notification panel, a file upload interface, a search bar, a dynamic data grid, a filter panel, a form validation component, or an interactive data visualization element.

7. The system of claim 1, wherein at least one of the business logic handlers is a script.

8. The system of claim 1, wherein at least one of the business logic handlers is linked to at least one specific UI component by an identifier.

9. The system of claim 1, wherein at least one of the business logic handlers includes instructions for handling user interactions, comprising at least one of click, input, or gesture.

10. The system of claim 1, wherein a first frontend framework is migrated to a second frontend framework by loading the second frontend framework adapter into the UI Toolkit without changing the one or more business logic handlers.

11. A method for rendering user interfaces across multiple frontend frameworks in a runtime environment, the method comprising:

loading and processing UI models with a UI toolkit operable within the runtime environment;

generating and rendering UI components for multiple frontend frameworks using the UI toolkit, the generating and rendering including:

converting abstract UI definitions from the UI models into framework-specific instructions using a plurality of framework adapters corresponding to different frontend frameworks, generating rendered UI components from converted abstract UI definitions, and processing user interactions with the rendered UI components by invoking one or more business logic handlers, wherein the business logic handlers are associated with UI components and include instructions and model parameters to define responsive behaviors across the multiple frontend frameworks; and defining UI components and behavior in a declarative manner such that each UI component is defined according to at least one property, at least one behavior, and at least one relationship with another UI component using an abstraction layer including a consistent model, wherein the consistent model causes, for a given abstraction layer command, a first UI component to be generated by the first frontend framework from the given abstraction layer command, and a second UI component to be generated by the second frontend framework from the given abstraction layer command, wherein the first UI component and the second UI component interact.

12. The method of claim 11, wherein the abstraction layer includes a predefined UI component template.

13. The method of claim 11, wherein the runtime environment is at least one of a web browser or a server-side environment, each configured to generate and render user interfaces.

14. The method of claim 11, wherein the UI toolkit is a lightweight library.

15. The method of claim 11, wherein the UI model is dynamically extensible and the method further comprises adding new UI components and behaviors without changing the one or more business logic handlers using the UI model.

16. The method of claim 11, wherein the UI component is at least one of a button, an input form, a table, a header, a text field, a data visualization chart, a navigation menu, a dialog box, a progress bar, a dropdown list, a multimedia player, an image gallery, an interactive map, a calendar widget, a collapsible sidebar menu, a notification panel, a file upload interface, a search bar, a dynamic data grid, a filter panel, a form validation component, or an interactive data visualization element.

17. The method of claim 11, wherein at least one of the business logic handlers is a script.

18. The method of claim 11, wherein at least one of the business logic handlers is linked to at least one specific UI component by an identifier.

19. The method of claim 11, wherein at least one of the business logic handlers includes instructions for handling user interactions, comprising at least one of click, input, or gesture.

20. The method of claim 11, further comprising:
    migrating a first frontend framework to a second frontend framework by loading the second frontend framework adapter into the UI Toolkit without changing the one or more business logic handlers.

* * * * *